(12) United States Patent
Svara et al.

(10) Patent No.: US 9,360,076 B2
(45) Date of Patent: Jun. 7, 2016

(54) DAMPERS

(71) Applicant: Titus International Limited, Uxbridge, Middlesex (GB)

(72) Inventors: Valter Svara, Izola (SI); Danijel Kozlovic, Dekani (SI); David Pecar, Pobegi (SI)

(73) Assignee: Titus International Limited, Uxbridge, Middlesex (GB)

( * ) Notice: Subject to any disclaimer, the term of this patent is extended or adjusted under 35 U.S.C. 154(b) by 0 days.

(21) Appl. No.: 14/396,820

(22) PCT Filed: Apr. 25, 2013

(86) PCT No.: PCT/GB2013/051057
§ 371 (c)(1),
(2) Date: Oct. 24, 2014

(87) PCT Pub. No.: WO2013/160685
PCT Pub. Date: Oct. 31, 2013

(65) Prior Publication Data
US 2015/0096854 A1    Apr. 9, 2015

(30) Foreign Application Priority Data
Apr. 25, 2012    (GB) .................................. 1207304.5

(51) Int. Cl.
*F16F 9/32*    (2006.01)
*F16F 9/34*    (2006.01)
*F16F 9/18*    (2006.01)

(52) U.S. Cl.
CPC ................. *F16F 9/3228* (2013.01); *F16F 9/18* (2013.01); *F16F 9/34* (2013.01)

(58) Field of Classification Search
CPC .............. F16F 9/3228; F16F 9/34; F16F 9/18
USPC ................... 267/226, 34, 118, 129; 188/281, 188/322.22, 316
See application file for complete search history.

(56) References Cited

U.S. PATENT DOCUMENTS

| | | | | |
|---|---|---|---|---|
| 4,433,759 A | * | 2/1984 | Ichinose | E05C 17/30 16/51 |
| 5,927,448 A | * | 7/1999 | Yamazaki | F16F 9/10 188/280 |
| 8,468,652 B2 | | 6/2013 | Salice | |
| 2009/0236783 A1 | | 9/2009 | Doffing et al. | |
| 2011/0253493 A1 | * | 10/2011 | Svara | F16F 9/0218 188/313 |

FOREIGN PATENT DOCUMENTS

DE    1907244 U    12/1964
WO    WO2011096907 A1    8/2011

* cited by examiner

*Primary Examiner* — Vishal Sahni
(74) *Attorney, Agent, or Firm* — Alan D. Kamrath; Kamrath IP Lawfirm, P.A.

(57) ABSTRACT

A piston and cylinder type damper has a cylinder (12) with a piston assembly (10) which is mounted for reciprocal linear movement therein. The piston assembly (10) divides the cylinder (12) into separate chambers with a restricted flow path extending therebetween for passage of damping fluid contained within it. A piston rod (11) is mounted for linear reciprocal movement with respect to the cylinder (12) and is arranged to engage the piston assembly (10) with abutting contact. The contact between the piston rod (11) and piston assembly (10) is arranged to be remote from the restricted flow path.

19 Claims, 2 Drawing Sheets

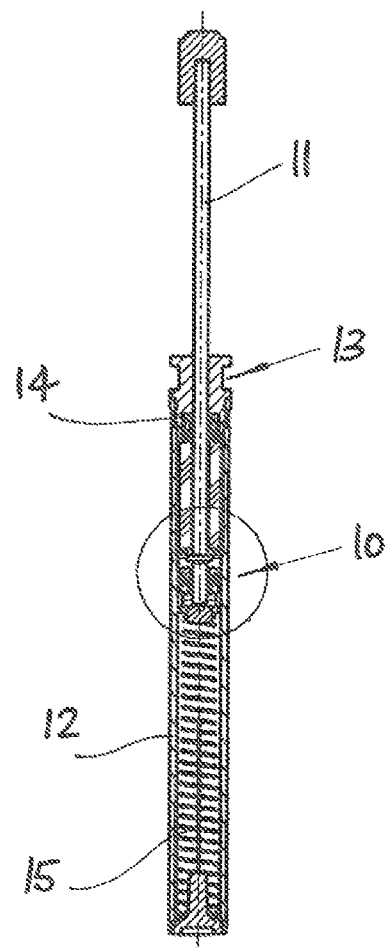
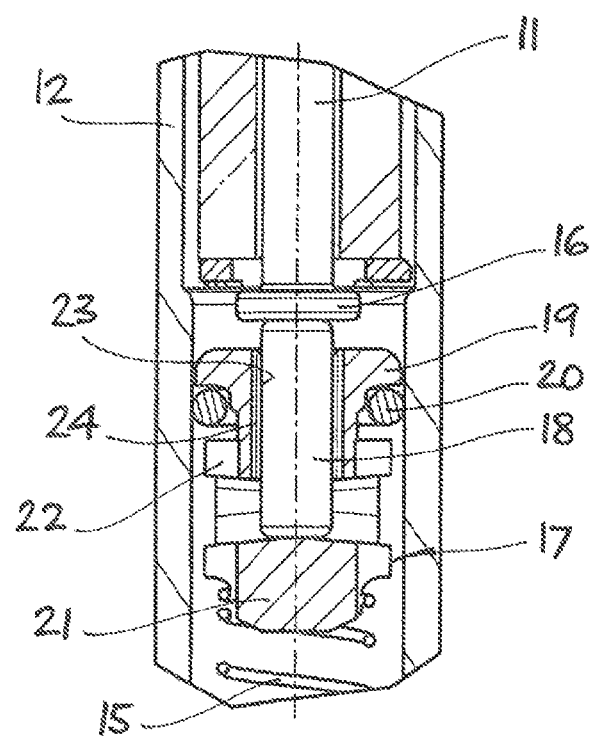
FIG. 1
FIG. 2

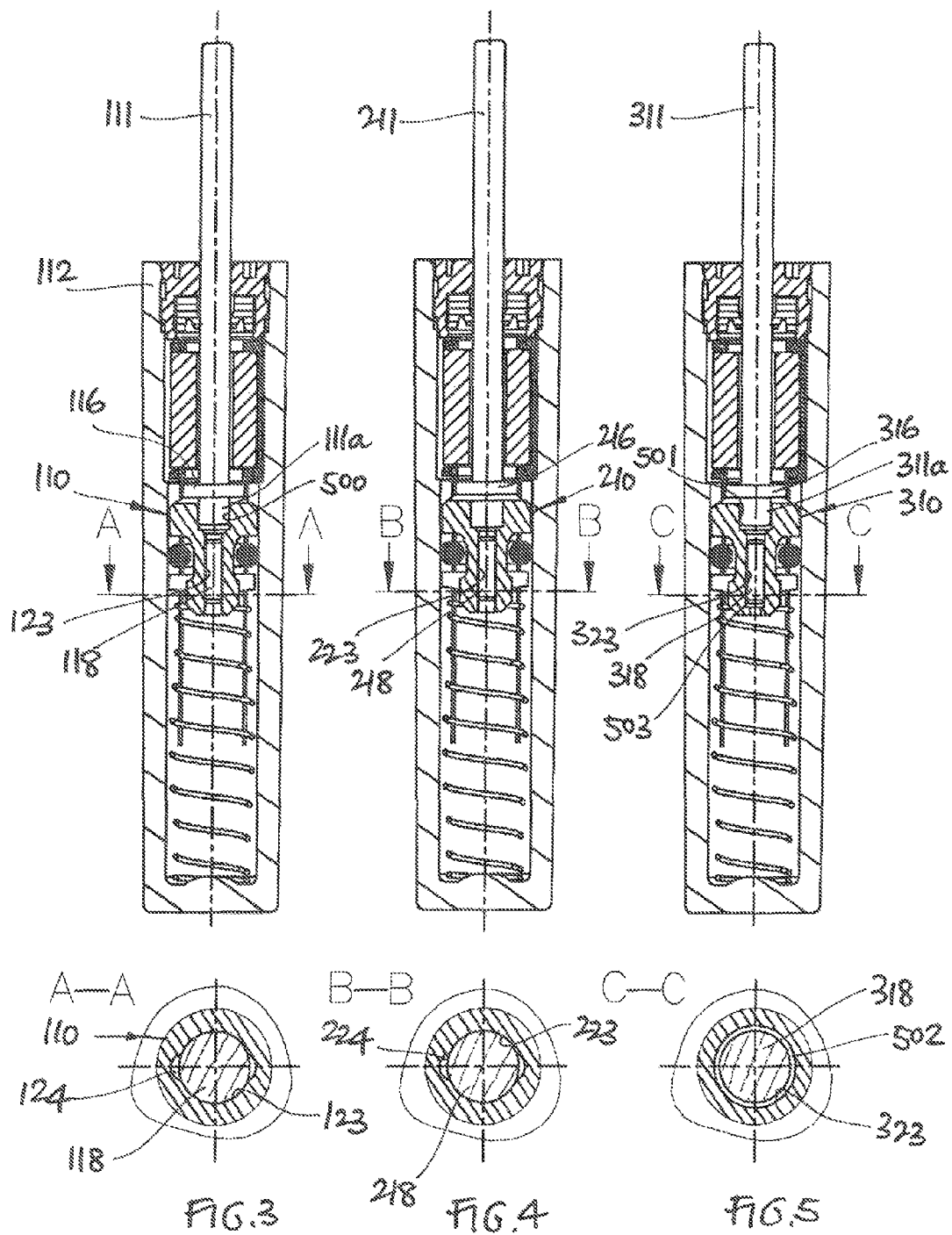

DAMPERS

This invention relates to dampers.

According to the invention, there is provided a piston and cylinder type damper having a cylinder with a piston assembly which is mounted for reciprocal linear movement therein and which divides the cylinder into separate chambers with a restricted flow path therebetween for passage of damping fluid contained within the cylinder, and a piston rod which is mounted for linear reciprocal movement with respect to the cylinder. The piston rod is arranged to engage the piston assembly with an abutting contact, and said contact between the piston rod and piston assembly is arranged to be separated from said restricted flow path.

By way of example, an embodiment of the invention will now be described with reference to the accompanying drawings, in which:

FIG. 1 is a cross-sectional view of a first embodiment of a damper according to the invention, FIG. 2 is a detail view of the piston assembly of the damper of FIG. 1, and FIGS. 3, 4 and 5 are cross-sectional views of further embodiments of a damper according to the invention.

The damper seen in FIG. 1 is a linear piston and cylinder type damper having a piston assembly 10, a piston rod 11 and a cylinder 12. The cylinder 12 has one closed end and contains a damping medium, such as oil or silicone. The piston rod 11 is mounted for linear reciprocal movement with respect to the cylinder 12 along its longitudinal axis. A free end of the piston rod 11 extends out of an open end of the cylinder 12. A cap assembly 13 closes off the open end of the cylinder 12. The cap assembly 13 provides support for the mounting of the piston rod 11 and has a suitable seal 14 to prevent leakage of damping medium out of the cylinder 12. The other end of the piston rod 11 extends into the interior of the cylinder 12 where it abuts against the piston assembly 10.

The piston assembly 10 divides the interior of the cylinder 12 into two separate chambers. A compression spring 15 is mounted between the closed end of the cylinder 12 and the piston assembly 10 and biasses the piston assembly towards the inner end of the piston rod 11. The inner end of the piston rod 11 is provided with a flange 16.

From FIG. 2 it will be seen that the piston assembly 10 is basically in two parts: a valve body 17 and an actuator 18. At its end near the piston rod 11, the valve body 17 has a flange 19 with an outer diameter just slightly less than the bore of the cylinder 12. This helps to guide the valve body 17 for reciprocal movement within the cylinder 12, along its longitudinal axis.

Beneath the flange 19, an O ring 20 is mounted on a reduced diameter portion of the valve body 17. The O ring 20 is in sealing engagement with the bore of the cylinder 12. However, its position on the valve body 17 is moveable, as will be explained in greater detail. At its other end, the valve body 17 terminates in a spigot 21, which acts as a seat for locating one end of the spring 15.

It will be seen that the O ring 20 is captured on the valve body 17 between the flange 19 and a ledge 22 spaced axially from it. The ledge 22 is apertured to allow free flow of damping fluid across it.

The actuator 18 is mounted within an axially aligned bore 23 in the valve body 17 and engages it with an interference fit. The bore 23 is provided with a series of small longitudinally extending grooves 24 spaced around its inner surface. The effect of this arrangement is that the grooves 24 provide communication between the two chambers in the form of a restricted flow path for passage of damping fluid across the piston assembly 10.

When an external force acts on the piston rod 11 in use of the damper, e.g. upon closing of a door, the flange 16 acts on the actuator 18 to displace the piston assembly 10 within the cylinder 12 towards its closed end. This displacement of the piston assembly 10 will cause the O ring 20 to jam against the flange 19 of the valve body 17, thus effectively sealing off communication between the two chambers around the outer periphery of the piston assembly. The only communication that is then open between the two chambers is via the grooves 24. The restricted flow of damping fluid that they allow thus provides a damping force to oppose the movement of the piston rod 11.

When the external force on the piston rod 11 has dissipated, the spring 15 acts via the piston assembly 10 to return the piston rod to its original extended position. Displacement of the piston assembly 10 in this direction has the effect of moving the O ring 20 out of sealing engagement with the flange 19 on the valve body 17, thus opening up a pathway for passage of damping fluid around the outer periphery of the piston assembly 10. The return movement of the piston rod 11 thus has little or no effective damping.

In this embodiment, the valve body 17 may conveniently be made of plastics material, whilst the actuator 18 is made of metal. The actuator 18 could conveniently be formed from standard rod stock. Although the piston assembly 10 is a compound part, i.e. made of two or more parts, this is nevertheless advantageous for production reasons. In particular, it facilitates control of the dimensions of the restricted flow path provided by the grooves 24. This is the critical factor that determines the damping capacity of the damper. Reliable control would be more difficult to achieve by making small holes through the valve body.

The piston rod 11 is also conveniently made of metal from standard rod stock, with its flange 16 formed by a suitable process such as rolling or stamping. Because the piston rod 11 and actuator 18 are separate parts, the piston rod can be made of larger diameter. This is useful if the damper is intended to have a particularly long stroke, because the piston rod 11 needs to have sufficient strength to resist getting jammed in the cylinder or even collapsing in use.

The separation of the piston rod 11 and actuator 18 also has another benefit. In conventional damper constructions where the piston assembly is mounted directly onto the piston rod, flexure of the piston rod will tend to cause the piston assembly to tilt out of alignment and hence jam in the cylinder. The arrangement of the damper seen here avoids this problem, because any flexing of the piston rod 11 will not disturb the alignment of the piston assembly 10. If the top surface of the actuator 18 is provided with a slightly rounded contour, this will help to avoid any lateral forces being transmitted to the piston assembly 10 by any flexure of the piston rod 11.

The flange 16 on the piston rod 11 ensures that it will not fall out of engagement with the actuator 18 in the event that the piston rod does flex. Of course, it will be appreciated that the flange could equally well be provided on the actuator instead of on the piston rod.

Alternative forms of damper constructions are seen in FIGS. 3, 4 and 5. In these examples, a restricted flow path is again provided for passage of damping fluid across the piston assembly, and this is arranged to be remote from the forces applied to the piston assembly via the piston rod. Thus, in the FIG. 3 embodiment, for example, a pin 118 is mounted in an axially aligned bore 123 in the piston assembly 110 and engages it with an interference fit. The restricted flow path is then defined by a pair of small axially extending grooves 124 in the bore 123, as seen in Section A-A of FIG. 3.

In this embodiment, the piston rod 111 has a larger diameter flange 116 with which it abuttingly engages the piston assembly 110. The piston rod 111 has a small end section 111a that extends beyond the flange 116 and is located within a bore 500 in the piston assembly 110. This arrangement helps to provide lateral guidance for the inner end of the piston rod 111 in its movement in and out of the cylinder 112.

Suitable provision is made for passage of damping fluid between the end section 111a and the piston assembly 110, for example, using axially extending grooves (not shown) in the bore 500. This will present a larger fluid passageway than that defined between the pin 118 and the bore 123, ensuring that the latter will act as the control of the restricted flow path across the piston assembly.

The embodiment seen in FIG. 4 is essentially the same as that seen in FIG. 3, except for the piston rod 211. The piston rod 211 here still has a larger diameter flange 216 which abuttingly engages the piston assembly 210 including a bore 223 receiving a pin 218 and having axially extending grooves 224. In this case, however, the piston rod 211 does not extend beyond the flange 216.

The embodiment seen in FIG. 5 is similar to the FIG. 3 example in terms of its piston rod 311. Thus, the piston rod 311 has a larger diameter flange 316 which abuttingly engages the piston assembly 310 and a small end section 311a that extends beyond the flange 316 and is located within a bore 501 in the piston assembly.

The piston assembly 310 has a restricted flow path for passage of damping fluid across it defined between an elongate pin 318 and an axially aligned bore 323 in the piston assembly. In this case, however, the pin 318 fits loosely within the bore 323, to leave an annular gap 502 therebetween, as seen in Section C-C of FIG. 5. The inner end of the piston assembly 310 here has a reduced diameter section which defines a shoulder 503. The pin 318 is thus effectively captured within the bore 323 between the shoulder 503 and the small end section 311a of the piston rod 311. The pin 318 is somewhat shorter in length than the axial extent of the bore 323, so that it is free to move axially between end positions. This arrangement enables further features to be designed in for the purpose of adding further control of the restricted flow path. It will be noted, however, that this is deliberately kept away from the forces that in use will act on the piston assembly from the piston rod.

The damper embodiments described above are particularly suitable for situations where relatively high forces are expected to be encountered and/or where a relatively long stroke is required.

The invention claimed is:

1. A piston and cylinder type damper having a cylinder with a piston assembly which is mounted for reciprocal linear movement therein and which divides the cylinder into separate chambers with a restricted flow path therebetween for passage of damping fluid contained within the cylinder, and a piston rod which is mounted for linear reciprocal movement along a longitudinal axis with respect to the cylinder, wherein the piston rod is arranged to engage the piston assembly with abutting contact at a point of abutting engagement, wherein said abutting contact between the piston rod and piston assembly is arranged to be separate from said restricted flow path, wherein one of the piston or the piston assembly comprises a flange at the point of abutting engagement with the other, and wherein an end of the other of the piston rod or the piston assembly has a rounded contact surface at the point of abutting engagement, with the rounded contact surface being rounded in a radial plane parallel to the longitudinal axis.

2. A damper as claimed in claim 1 wherein the piston assembly contains a valve body and an actuator, with the restricted flow path being defined therebetween.

3. A damper as claimed in claim 2 wherein said abutting contact of the piston rod is with the actuator.

4. A damper as claimed in claim 3 wherein the actuator is elongate and arranged with a longitudinal axis coincident with the longitudinal axis of the piston rod.

5. A damper as claimed in claim 3 wherein the piston rod comprises the flange at the point of abutting engagement.

6. A damper as claimed in claim 5 wherein the end of the actuator has the rounded contact surface.

7. A damper as claimed in claim 6 wherein the actuator is made of metal rod stock and fits in a bore in the valve body, with the restricted flow path being defined by axially extending grooves in said bore.

8. A damper as claimed in claim 7 wherein the actuator is movable with respect to the valve body.

9. A damper as claimed in claim 8 wherein the actuator is able to move axially.

10. A damper as claimed in claim 9 wherein the actuator is free to move between end positions in the valve body.

11. A damper as claimed in claim 2 wherein the piston rod comprises the flange at the point of abutting engagement.

12. A damper as claimed in claim 1 wherein the actuator is made of metal rod stock and fits in a bore in the valve body, with the restricted flow path being defined by axially extending grooves in said bore.

13. A damper as claimed in claim 12 wherein the actuator is movable with respect to the valve body.

14. A damper as claimed in claim 13 wherein the actuator is able to move axially.

15. A damper as claimed in claim 3 wherein the piston rod comprises the flange at the point of abutting engagement.

16. A damper as claimed in claim 2 wherein the actuator is made of metal rod stock and fits in a bore in the valve body, with the restricted flow path being defined by axially extending grooves in said bore.

17. A damper as claimed in claim 16 wherein the actuator is movable with respect to the valve body.

18. A damper as claimed in claim 17 wherein the actuator is able to move axially.

19. A damper as claimed in claim 18 wherein the actuator is free to move between end positions in the valve body.

* * * * *